(12) United States Patent
Hartnell et al.

(10) Patent No.: US 10,399,685 B2
(45) Date of Patent: Sep. 3, 2019

(54) BUCKLE ASSEMBLY WITH RESETTING ARRANGEMENT

(71) Applicant: Martin-Baker Aircraft Co. Ltd., Nr. Uxbridge. Middlesex (GB)

(72) Inventors: Graham Hartnell, Nr. Uxbridge (GB); Stephen Ruff, Nr. Uxbridge (GB)

(73) Assignee: MARTIN-BAKER AIRCRAFT CO. LTD., Nr. Uxbridge (GB)

( * ) Notice: Subject to any disclaimer, the term of this patent is extended or adjusted under 35 U.S.C. 154(b) by 319 days.

(21) Appl. No.: 14/458,970

(22) Filed: Aug. 13, 2014

(65) Prior Publication Data

US 2015/0047155 A1 Feb. 19, 2015

(30) Foreign Application Priority Data

Aug. 15, 2013 (GB) .................................. 1314629.5

(51) Int. Cl.
 *B64D 17/00* (2006.01)
 *A44B 11/25* (2006.01)
 *B64D 17/32* (2006.01)

(52) U.S. Cl.
 CPC ......... *B64D 17/32* (2013.01); *Y10T 24/45241* (2015.01)

(58) Field of Classification Search
 CPC ......... A44B 11/26; A44B 11/25; B60R 22/32; B60R 22/12; B64D 17/32
 USPC ...................................... 24/602, 603, 593.1
 See application file for complete search history.

(56) References Cited

U.S. PATENT DOCUMENTS

| | | | | |
|---|---|---|---|---|
| 1,899,656 A | * | 2/1933 | Wigley ................. | B64D 17/30 24/313 |
| 2,504,125 A | * | 4/1950 | Hight .................... | B64D 17/32 24/313 |
| 2,668,997 A | * | 2/1954 | Irvin ..................... | B64D 17/32 24/632 |
| 2,892,232 A | * | 6/1959 | Cuthbert et al. ....... | B64D 17/32 24/632 |
| 2,899,732 A | * | 8/1959 | Cushman .............. | B64D 17/32 24/632 |
| 3,132,399 A | * | 5/1964 | Cooper ................. | B64D 17/32 24/632 |

(Continued)

FOREIGN PATENT DOCUMENTS

| | | |
|---|---|---|
| DE | 32 34 486 C1 | 9/1983 |
| GB | 2 151 693 A | 7/1985 |
| WO | WO 82/01529 A1 | 5/1982 |

OTHER PUBLICATIONS

United Kingdom Intellectual Property Office, Search Report—Application No. GB1314629.5, dated Feb. 18, 2014 (3 pages).

*Primary Examiner* — Jason W San
(74) *Attorney, Agent, or Firm* — McCarter & English, LLP; Jonathan C. Lovely

(57) ABSTRACT

A buckle assembly includes at least one socket to receive and retain at least one lug therein, and an emergency release arrangement. The emergency release arrangement is operable to release the at least one lug from the socket in response to a predetermined trigger signal. The assembly also includes a manually operable resetting arrangement that is operable to retain the lug(s) re-inserted into the socket(s), following the triggering of the emergency release arrangement.

17 Claims, 14 Drawing Sheets

(56) References Cited

U.S. PATENT DOCUMENTS

| | | | | |
|---|---|---|---|---|
| 3,277,545 A * | 10/1966 | Martin | B60R 22/30 | |
| | | | | 236/1 C |
| 3,617,019 A * | 11/1971 | Femia | B64D 17/32 | |
| | | | | 24/313 |
| 3,639,948 A * | 2/1972 | Sherman | A44B 11/2542 | |
| | | | | 24/632 |
| 3,747,167 A * | 7/1973 | Pravaz | A44B 11/2542 | |
| | | | | 24/573.11 |
| 3,825,979 A * | 7/1974 | Jakob | A44B 11/2534 | |
| | | | | 24/579.11 |
| 3,952,381 A * | 4/1976 | Barbe | B60R 22/324 | |
| | | | | 24/602 |
| 3,967,797 A * | 7/1976 | Drew | B64D 17/32 | |
| | | | | 24/603 |
| RE29,342 E * | 8/1977 | Barbe | B60R 22/324 | |
| | | | | 24/602 |
| 4,228,568 A * | 10/1980 | Frost | A44B 11/2557 | |
| | | | | 24/579.11 |
| 4,589,172 A * | 5/1986 | Hoenigs | B64D 17/32 | |
| | | | | 24/602 |
| 4,610,058 A * | 9/1986 | Stemmildt | B64D 17/32 | |
| | | | | 24/579.11 |
| 4,656,700 A * | 4/1987 | Tanaka | A44B 11/2542 | |
| | | | | 24/579.11 |
| 4,742,604 A * | 5/1988 | Mazelsky | A44B 11/2542 | |
| | | | | 24/579.09 |
| 4,813,111 A * | 3/1989 | Nohren | B64D 17/32 | |
| | | | | 24/573.11 |
| 4,815,177 A | 3/1989 | MacKew | 24/602 | |
| 4,903,382 A * | 2/1990 | Held | B63B 22/14 | |
| | | | | 24/602 |
| 5,036,660 A * | 8/1991 | Aronne | B64D 17/32 | |
| | | | | 137/81.2 |
| 5,857,246 A * | 1/1999 | Becnel | B60R 22/321 | |
| | | | | 24/602 |
| 7,159,284 B2 * | 1/2007 | Gastaldi | A44B 11/2542 | |
| | | | | 24/632 |
| 7,384,014 B2 * | 6/2008 | Ver Hoven | B60R 22/415 | |
| | | | | 242/382.2 |
| 7,716,794 B2 * | 5/2010 | Wu | A44B 11/2511 | |
| | | | | 24/579.11 |
| 7,963,614 B2 * | 6/2011 | Kranz | A44B 11/2542 | |
| | | | | 24/579.11 |
| 8,468,660 B2 * | 6/2013 | Holler | A44B 11/2542 | |
| | | | | 24/573.11 |
| 8,631,545 B2 * | 1/2014 | Ford | A44B 11/2542 | |
| | | | | 24/573.11 |
| 8,888,127 B2 * | 11/2014 | Santana-Gallego | B60R 21/18 | |
| | | | | 280/733 |
| 9,072,346 B2 * | 7/2015 | Greaves | A44B 11/2511 | |
| 9,084,452 B2 * | 7/2015 | Blackman | A44B 11/2569 | |
| 9,119,445 B2 * | 9/2015 | Humbert | A44B 11/253 | |
| 9,277,788 B2 * | 3/2016 | Humbert | A44B 11/2569 | |
| 2010/0125983 A1 * | 5/2010 | Keene | A44B 11/2526 | |
| | | | | 24/593.1 |
| 2010/0281660 A1 * | 11/2010 | Lee | A44B 11/2523 | |
| | | | | 24/593.1 |
| 2011/0010901 A1 * | 1/2011 | Holler | A44B 11/2542 | |
| | | | | 24/593.1 |
| 2012/0174353 A1 * | 7/2012 | Lee | A44B 11/2523 | |
| | | | | 24/593.1 |
| 2013/0212845 A1 * | 8/2013 | Ford | A44B 11/2542 | |
| | | | | 24/602 |
| 2015/0208792 A1 * | 7/2015 | Bergkvist | A45F 3/04 | |
| | | | | 224/258 |
| 2016/0339869 A1 * | 11/2016 | Schmidt | B60R 22/48 | |

* cited by examiner

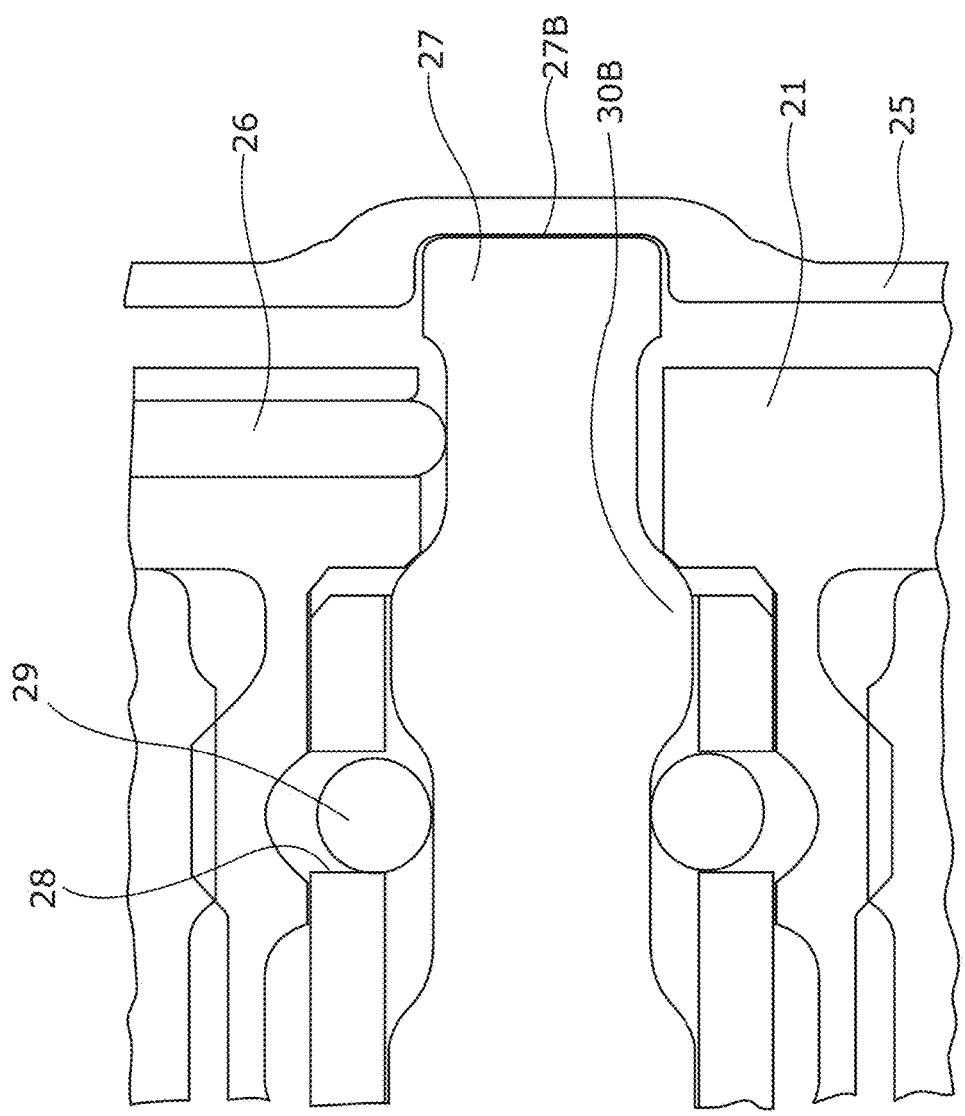

BUCKLE ASSEMBLY WITH RESETTING ARRANGEMENT

PRIORITY

This application claims priority from UK patent application no 1314629.5 filed on 15 Aug. 2013, entitled "A Buckle Assembly with Resetting Arrangement," and naming Graham Hartnell and Stephen Ruff as inventors, the disclosure of which is incorporated herein, in its entirety, by reference.

TECHNICAL FIELD

The present invention relates to a buckle assembly. The present invention also relates to harness arrangement comprising the buckle assembly of the invention and an ejection seat having the harness arrangement.

BACKGROUND ART

It is known to secure two webbing straps together by the use of a buckle assembly. The buckle assembly is secured to one webbing strap and a lug is attached to the other webbing strap. The lug is securely but releasably retained in a socket of the buckle assembly. The lug is released from the socket arrangement in response to a user manually operating a button, switch, lever or other user operated input.

Such buckle assemblies are widely used in harness arrangements in aircraft. Attachment of a pilot to the ejection seat of the aircraft is normally by means of a conventional multi-point harness having a central connection block to which numerous webbing straps are connected. The multi-point connection block, incorporating a buckle assembly, is usually provided on a strap (the "negative-G strap") connected to or adjacent the seat squab of the ejection seat. The strap passes between the legs of the pilot for connection of shoulder and lap webbing straps to the connection block.

It is necessary for a buckle assembly to afford quick manual attachment and detachment of the socket arrangement and lug(s) in normal use. At the same time, operation of the buckle assembly must be reliable and ensure secure retention of the lug(s) in the socket arrangement when desired. Any inadvertent, undesired, release of the lug from the socket arrangement must be prevented.

When a pilot ejects from an aircraft, the pilot will remain secured to the ejection seat for a predetermined period of time, at least until the parachute has fully deployed. In some situations, the pilot may remain attached to the seat substantially until the pilot lands. Particularly when landing on water, it is preferable for the pilot to remain close to the ejection seat, since it houses numerous survival provisions, such as a life-raft, flares, food etc.

Nevertheless, when landing in water, it is essential that the pilot is separated from the ejection seat as soon as possible, so that the pilot can swim free from the ejection seat.

It is known to provide a water-activated buckle assembly which, upon the detection of water, automatically releases the buckle assembly and therefore the pilot from the seat. Known systems comprise a water sensor located remote from the buckle assembly and operably connected by an actuator to the buckle assembly. In a known arrangement, a buckle assembly comprises a sacrificial pyrotechnic squib which, in response to a trigger condition from a water sensor, initiates to release the plurality of lugs from the buckle assembly. Such an arrangement is only a single use item since, once activated, the assembly will no longer be operable to receive and retain a lug in the assembly.

It has been known for such water-activated buckle assemblies to be inadvertently triggered. For example, a pilot may accidentally spill liquid over the water sensor. Alternatively, one of the components of the assembly (e.g. sensor, squib) may fail, causing triggering of the assembly. This causes the buckle assembly to automatically release the harness arrangement, with no provision to re-secure the lugs to the connection block. When a conventional water-sensing buckle assembly has been triggered, there is no way to reattach the lugs to the buckle assembly. The spent trigger system (i.e. the squib) must first be replaced before normal operation of the buckle assembly can be restored. This is clearly undesirable, particularly if the inadvertent release occurs during flight. There is a need for a reliable buckle assembly which seeks to address at least one of these problems.

SUMMARY OF THE EMBODIMENTS

Accordingly, a first embodiment of the present invention provides a buckle assembly comprising (1) at least one socket to receive and retain at least one lug therein, (2) an emergency release arrangement operable to release the at least one lug from the socket in response to a predetermined trigger signal, and (3) a manually operable resetting arrangement, operable to retain the at least one lug re-inserted into the at least one socket, following the triggering of the emergency release arrangement.

Preferably, the resetting arrangement is configured to retain the at least one lug in the socket by rotating a first component of the buckle assembly relative to a second component of the buckle assembly.

Advantageously, the emergency release arrangement is configured to release the at least one lug from the socket by translating a first component of the buckle assembly relative to a second component of the buckle assembly.

Conveniently, the buckle assembly comprises a base plate and a face plate, wherein the face plate is translatable with respect to the base plate and the at least one socket is defined in the base plate.

Preferably, the buckle assembly further comprises at least one socket plunger associated with the face plate, the socket plunger biased towards the base plate, and receivable in use in an aperture of the at least one lug, to retain the lug in the socket.

Advantageously, the buckle assembly is configured to release the lug from the socket when the base plate and face plate are spaced apart by at least a predetermined distance.

Conveniently, the emergency release arrangement comprises a protractor cartridge.

Preferably, the protractor cartridge is a squib.

Advantageously, the resetting arrangement comprises a reset plate which, when rotated with respect to the base plate, causes the face plate to move towards the base plate.

Conveniently, the buckle assembly further comprises a resetting carriage associated with the reset plate, an outer surface of a cylindrical portion of the resetting carriage being threaded and received within a threaded bore of the face plate.

Preferably, the emergency release arrangement comprises a protractor cartridge mounted in a cartridge holder, and a part of the cartridge holder is cylindrical and received within the cylindrical portion of the resetting carriage.

Advantageously, the buckle assembly further comprises a shuttle member translatable within the cylindrical portion of the cartridge holder and arranged in abutment with the operational end of the protractor cartridge.

Conveniently, upon initiation of the protractor cartridge, the shuttle member is caused to translate away from the cartridge and to engage with the resetting carriage, the force imparted by the protractor cartridge causing the resetting carriage and face plate to translate away from the base plate by at least a predetermined amount.

Preferably, the buckle assembly is configured such that, before triggering of the cartridge, the shuttle member is positioned to prevent the resetting carriage from translating with respect to the cartridge holder.

Advantageously, the cylindrical portion of the cartridge holder comprises at least one aperture to retain at least one locking ball; and the shuttle member varies in profile along its length.

Conveniently, the buckle assembly further comprises a water sensor associated with the emergency release arrangement.

Preferably, the water sensor comprises a plurality of water sensing modules, the water sensor configured to send a signal to the emergency release arrangement only when at least two of the water sensor modules indicates the detection of water.

Advantageously, the water sensor is housed within a chamber, the chamber having a plurality of apertures for the ingress of water.

Conveniently, each of the water sensing modules protrudes through an opening into fluid communication with the chamber, and each of the water sensing modules is surrounded by a lip.

Preferably, the buckle assembly further includes at least one associated lug.

The present invention further provides a harness arrangement comprising at least one buckle as described herein.

The present invention further provides an ejection seat having a harness arrangement as described herein.

The present invention further provides an aircraft including an ejection seat as a described herein.

BRIEF DESCRIPTION OF THE DRAWINGS

The foregoing features of embodiments will be more readily understood by reference to the following detailed description, taken with reference to the accompanying drawings, in which:

FIG. 4A shows an enlarged part of FIG. 4.

DETAILED DESCRIPTION OF SPECIFIC EMBODIMENTS

General Arrangement of the Buckle Assembly

Figure 1:
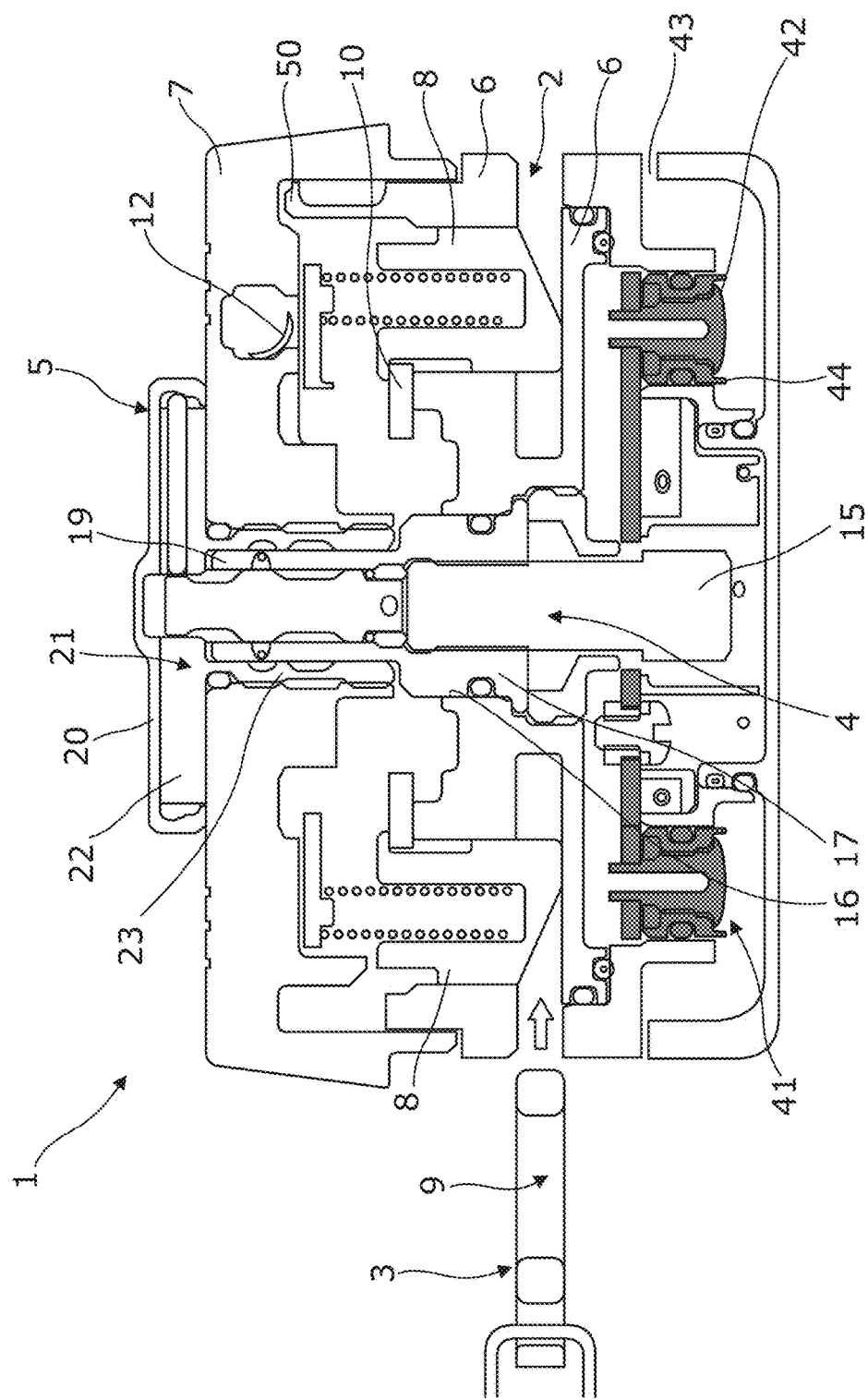
FIG. 1 shows a partial cross-section of a buckle assembly embodying the present invention.

With reference to FIG. 1, a buckle assembly 1 according to the present invention provides at least one socket 2 to receive and retain at least one lug 3 therein; and an emergency release arrangement 4 operable to release the at least one lug 3 from the socket 2 in response to a predetermined trigger signal. Further, the buckle assembly 1 provides a manually operable resetting arrangement 5, operable to retain the at least one lug 3 in the at least one socket 2, following the triggering of the emergency release arrangement 4.

A benefit of the buckle assembly 1 embodying the present invention is that, if the emergency release arrangement 4 is inadvertently triggered, it is possible for a pilot to subsequently re-insert and retain the lugs in the socket 2 in a manual resetting operation. Accordingly, the pilot can at least temporarily re-secure the lugs 3 to the socket 2 as a temporary measure, until the emergency release arrangement 4 can be replaced serviced.

Preferably, the manually operable resetting arrangement 5 is configured to operate by rotating a component of the resetting arrangement 5 relative to another component of the buckle assembly 1. Accordingly, after the emergency release arrangement 4 has been triggered, a pilot can reset the buckle assembly 1 by rotating the component relative to the buckle assembly 1, so that the buckle assembly 1 is then able once more to receive and retain at least one lug 3 within the socket 2.

Socket Arrangement

The buckle assembly 1 comprises a base plate 6 and a face plate 7. The face plate 7 is moveable with respect to the base plate 6. At least one socket 2 is defined in the base plate. Two sockets 2 are shown in cross section in FIG. 1. Preferably, there are four sockets 2 defined in the assembly 1.

At least one socket plunger 8 (see FIG. 1) is operably connected to the face plate 7, and is biased towards the base plate 6. The socket plungers 8 are constrained to linear movement within a socket plunger cylinder provided in the base plate 6. In normal use, the socket plunger 8 extends across the channel of the socket 2. The lugs 3 for use with the buckle assembly 1 each comprise an aperture 9. In use, when a lug 3 is received in the socket 2, the socket plunger 8 is received in or through the aperture 9, to retain the lug 3 within the socket 2. As is conventional, the end of the socket plunger 8 is provided with a ramped surface, such that as the lug 3 is inserted into the socket 2, the socket plunger 8 is caused to translate, against its bias. When the aperture 9 is aligned with the socket plunger 8, the biasing force urges the socket plunger 8 into the aperture 9 of the lug 3 to retain the lug 3 in the socket 2.

The lug 3 is released from the socket 2 by translating the socket plunger 8 out of engagement with the aperture 9 of the lug 3.

The socket plunger 8 is translated with respect to the socket 2 by either a manual release arrangement or an emergency release arrangement, both described below.

Manual Release Arrangement

In normal use, the lug 3 may be released from the socket 2 by a manual release arrangement operable by the pilot. The manual release arrangement causes the socket plungers 8 to translate with respect to the socket 2 of the base plate 6, against their bias, so as to allow removal of the lugs 3. Preferably, the manual release arrangement is operated by rotating the face plate 7 with respect to the base plate 6 in either direction. A plunger plate 10 is positioned for engagement with an upper lip 50 of the socket plungers 8. The plunger plate is constrained to linear translation with respect to the base plate 6. The plunger plate 10 is connected to the face plate 7 by levers 11.

Figure 7A:
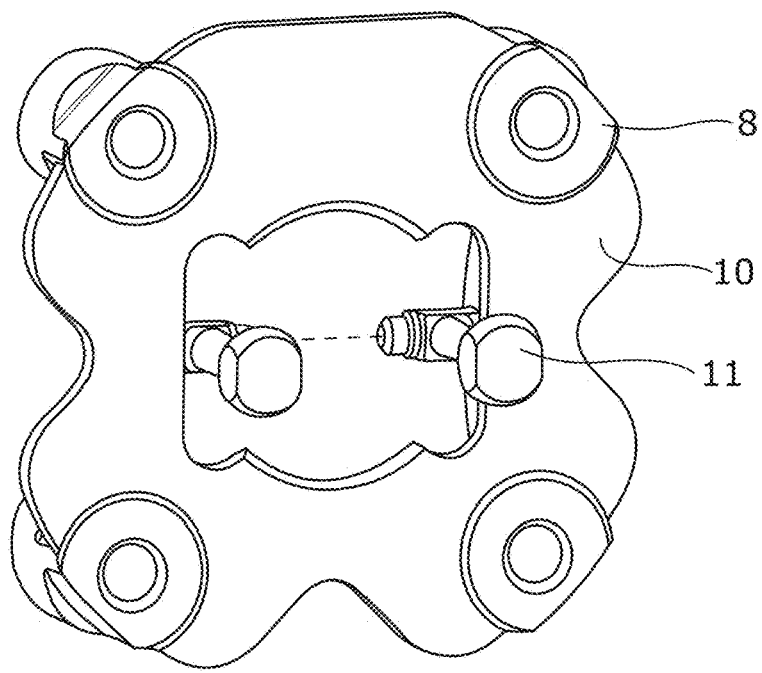
FIGS. 7A and 7B show the manual release arrangement.
Figure 7B:
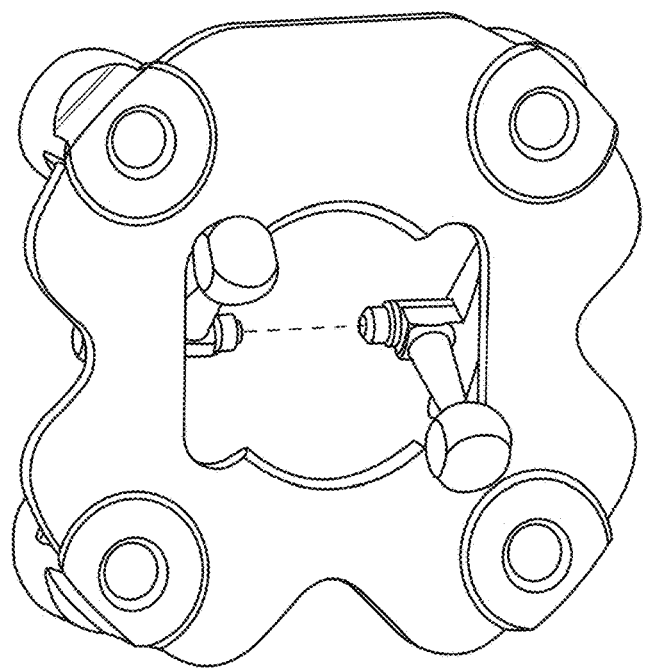

With reference to FIG. 7, as the face plate 7 is rotated with respect to the base plate 6, the plunger plate 10 is caused to translate linearly away from the base plate 6, towards the face plate 7. In so doing, the plunger plate 10 engages with the lip 50 of the socket plungers 8, causing them to translate linearly, against their bias, out of the socket 2.

Accordingly, rotation of the face plate 7 with respect to the base plate 6 allows for the release of the lug 3 from the socket 2. When the manual rotational force on the face plate 7 is released, a face plate biasing spring 12 causes the face plate 7 to return to its original rotational position with respect to the base plate 6. At the same time, the biasing of the socket plungers 8 cause them to linearly translate with respect to the socket 2.

Figure 8:
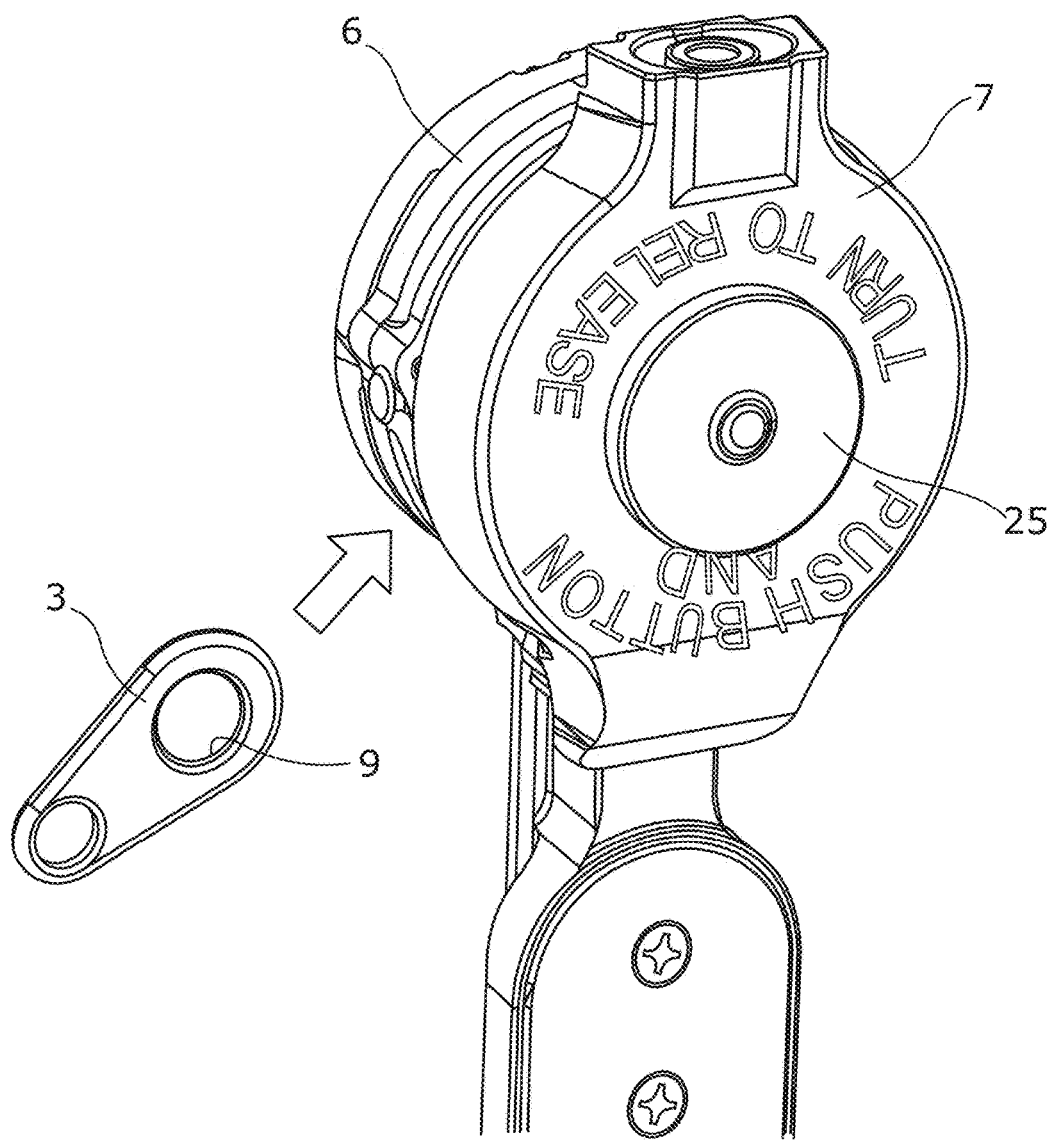
FIG. 8 shows the attachment of lugs to the buckle assembly.

So as to prevent inadvertent manual release of the lug 3 from the socket 2, rotation of the face plate 7 with respect to the base plate 6 may be prevented unless at least one user operated button is operated. (See FIG. 8).

Emergency Release Arrangement and Manually Operable Resetting Arrangement

In addition to a manual release arrangement for releasing the lug 3 from the socket 2, the present invention further provides an emergency release arrangement.

Generally speaking, the emergency release arrangement 4 of a buckle assembly 1 embodying the present invention causes the face plate 7 to translate away from the base plate 6 in response to a predetermined trigger signal—i.e. from a water sensor (41) containing water sensing modules (42), a plurality of apertures (43) for the ingress of water and a lip (44) around each water sensing module (42). In turn, this causes the socket plungers 8 to translate with respect to the socket to release the lug from the socket. The operation of the emergency release arrangement 4 and the manually operable resetting arrangement 5 will now be described.

Figure 9:
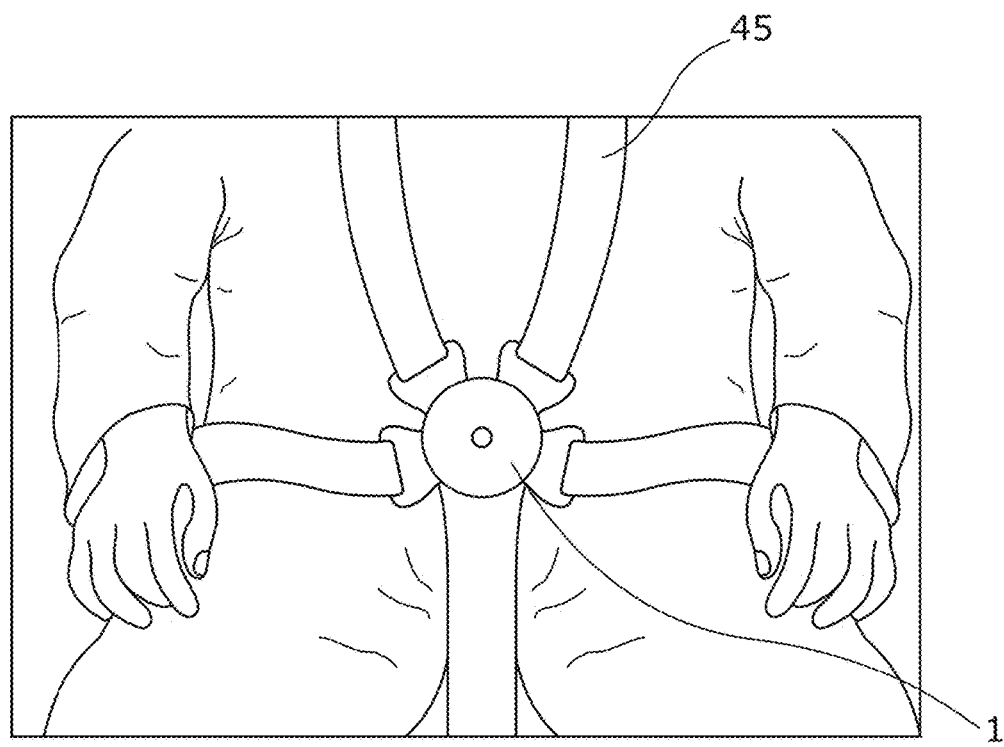
FIG. 9 shows the buckle assembly as part of a harness arrangement.

The base plate 6 is a generally circular armature, for attachment to a strap and/or part of a harness arrangement 45 (FIG. 9). Various components for the control of the emergency release arrangement 4 are mounted on the rear of the base plate 6. The base plate 6 comprises a central aperture 16, in which a cartridge holder 17 is mounted. The cartridge holder 17 may be secured in the aperture 16 of the base plate 6 by any conventional means, such as a thread. The cartridge holder 17 comprises a base portion 18 and a substantially cylindrical portion 19, which will be described in more detail below.

Figure 2:
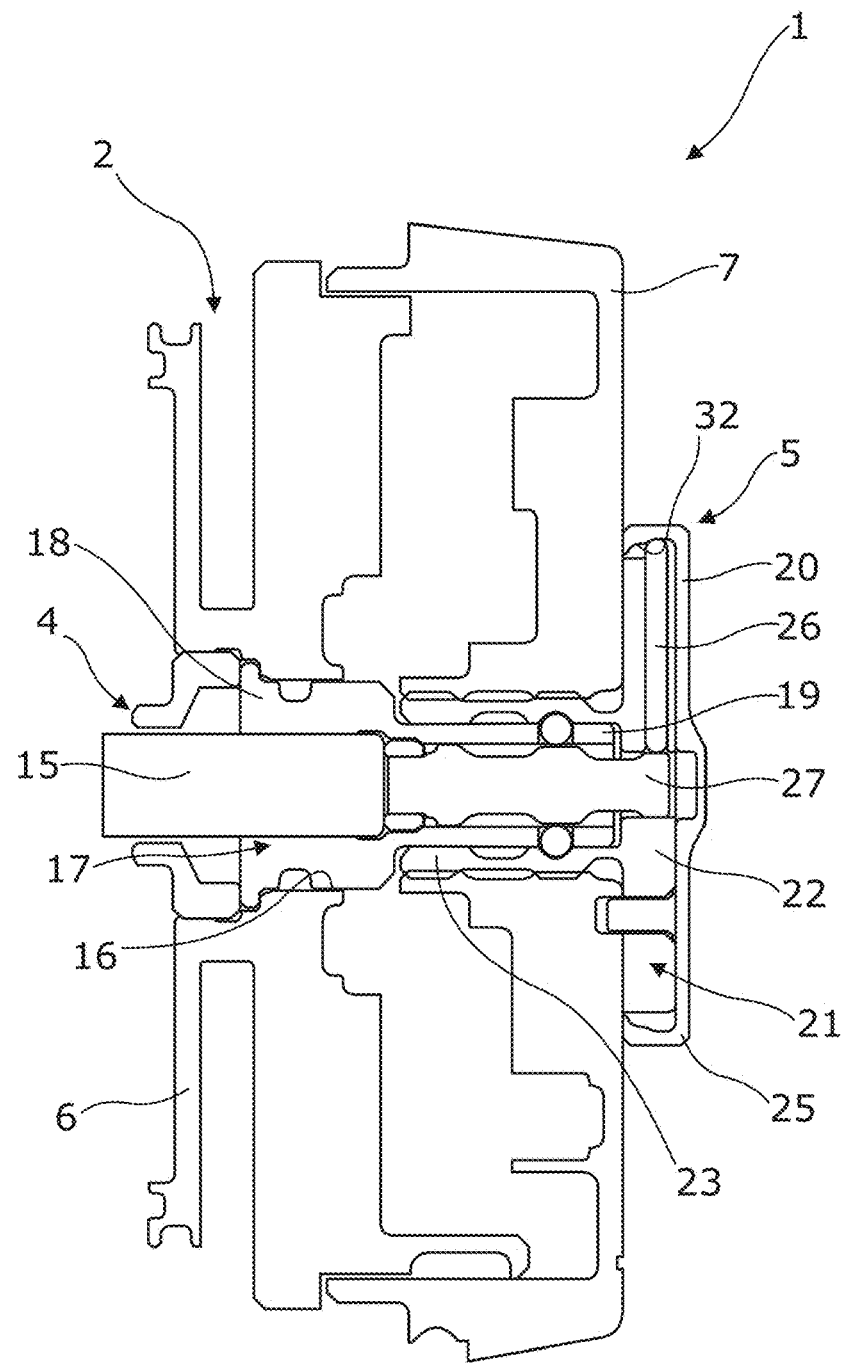
FIG. 2 shows a partial cross-section of the buckle assembly in a dormant condition.

A protractor cartridge 15 is mounted, in use, in the base portion 18 of the cartridge holder 17. Initiation of the cartridge 15 causes the expansion of the material of the cartridge 15. With reference to FIG. 2, initiation of the cartridge 15 causes the expansion of the material towards the right along the longitudinal axis of the assembly 1.

The resetting arrangement 5 comprises a reset plate 20 and a resetting carriage 21. The resetting carriage 21 comprises a substantially circular disc portion 22 and a cylindrical portion 23 extending from one side of the disc portion 22. The circular disc portion 22 comprises a central aperture. When the buckle assembly 1 is assembled, the cylindrical portion 19 of the cartridge holder 17 is received within the cylindrical portion 23 of the resetting carriage 21. The profile of the cylindrical portion 23 of the resetting carriage 21 varies along its length.

At least part of the outer surface 46 of the cylindrical portion 23 of the resetting carriage 21 is threaded, and screwed into a corresponding threaded aperture 24 of the face plate 7. During assembly, the resetting carriage 21 is screwed into the aperture 24 of the face plate 7 until the circular disc portion 22 abuts the front surface of the face plate 7.

The disc portion 22 of the resetting carriage 21 is covered by a reset plate 25. As shown in FIG. 2, a locking pin 26 is provided in a bore within the disc portion 22 of the resetting carriage 21. The locking pin 26 extends from the outer edge of the disc portion 22 to the aperture of the cylindrical portion 23 of the resetting carriage 21.

The buckle assembly 1 further comprises a shuttle member 27 translatable within the cylindrical portion 19 of the cartridge holder 17. One end 27A of the shuttle member 27 is arranged in abutment with the operational end of the protractor cartridge 15.

Figure 2A:
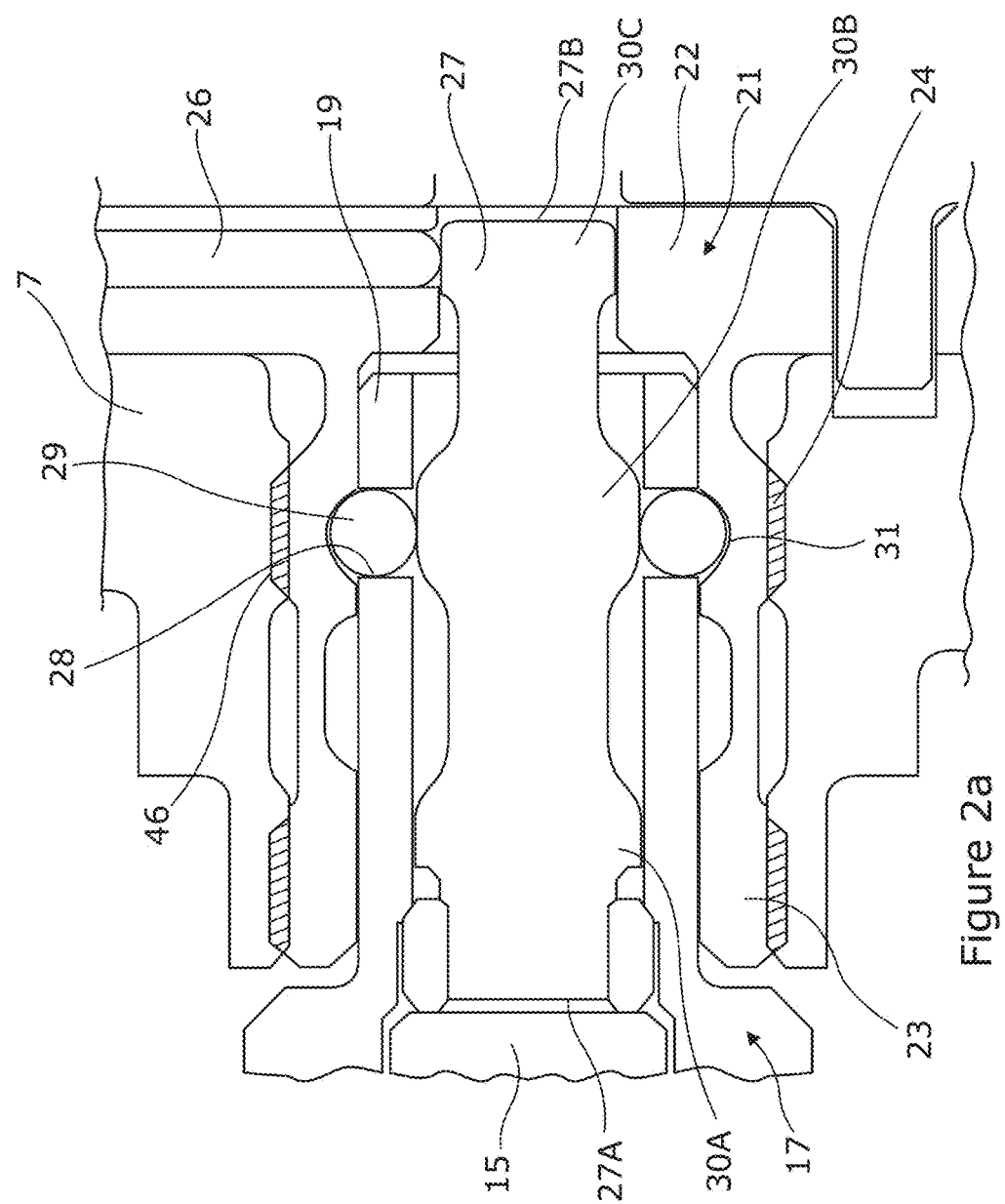
FIG. 2A shows an enlarged part of FIG. 2.

The shuttle member 27 varies in thickness along its length. As shown in FIGS. 2 and 2A, the shuttle member comprises first, second and third radially enlarged sections 30A, 30B and 30C, the purpose of which will be described in more detail below.

FIG. 2 shows the buckle assembly 1 prior to the initiation of the emergency release arrangement. Towards the end of the cylindrical portion 19 of the cartridge holder 17, there is provided a pair of apertures 28 each holding at least one locking ball 29 (two are shown in cross-section). Due to the relative positioning of the shuttle member 27 and cylindrical portion 19 of the cartridge holder 17, the second radially enlarged section 30B of the shuttle member 27 urges the locking balls 29, through the apertures 28, and into engagement with a radial recess 31 inside the cylindrical portion 23 of the resetting carriage 21. Each locking ball 29 is urged into the radial recess 31, which prevents relative translational movement of the resetting carriage 21 with respect to the cartridge holder 17. The prevention of relative movement of the resetting carriage 21 with respect to the cartridge holder 17 prevents relative movement of the face plate 7 with respect to the base plate 6. Consequently, the locking plungers 8 continue to retain the lug(s) 3 in the socket(s) 2.

The third radially enlarged portion 30C of the shuttle member 27 contacts the end of the locking pin 26 and urges it into engagement with an inner ramped section 32 of the reset plate 32 (see FIG. 2A). As a result, the reset plate 20 is held in contact with the resetting carriage 21.

Figure 3:
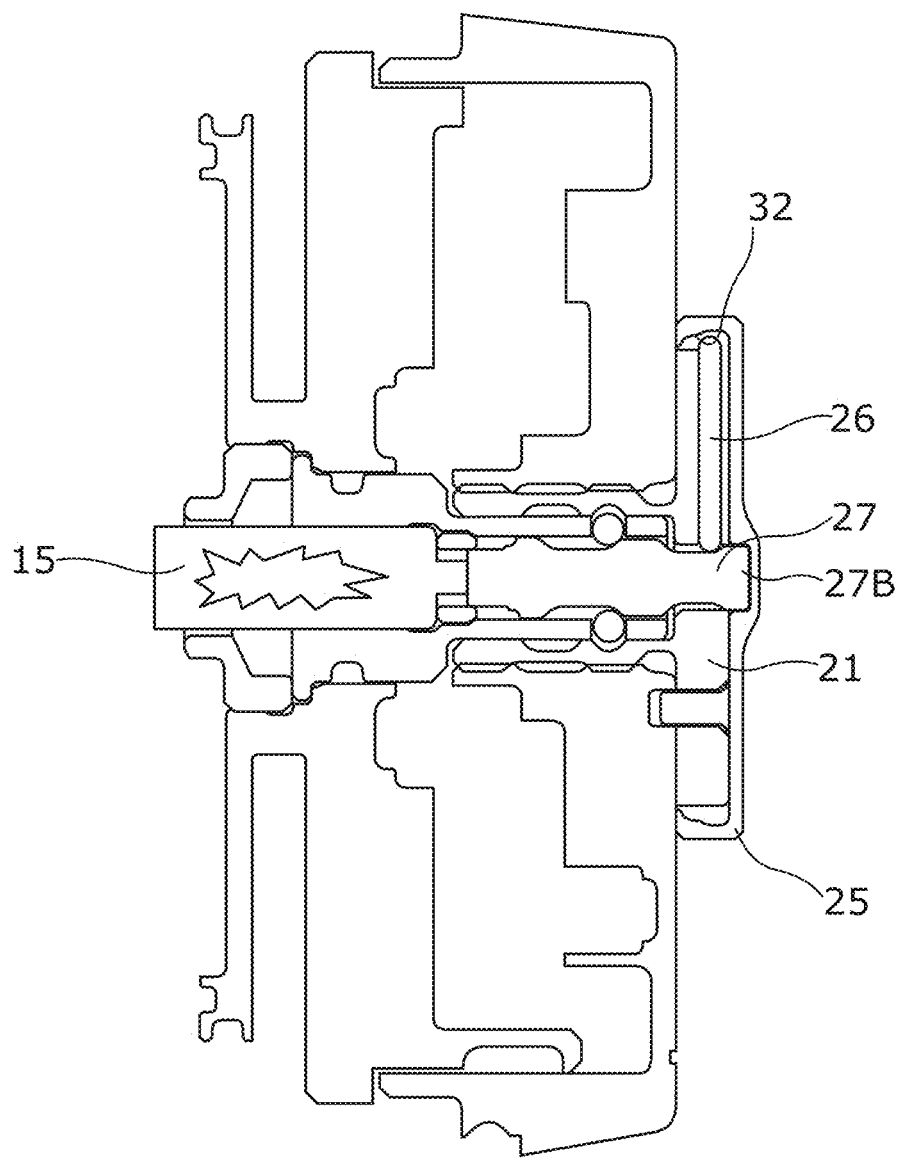
FIG. 3 shows the buckle assembly in a first phase of initiation of the emergency release arrangement.

Upon initiation of the protractor cartridge 15, the expansion of the material of the cartridge causes the shuttle member 27 to translate towards the reset plate 25, away from the cartridge holder 17. With reference to FIG. 3, as the shuttle member 27 translates (to the right), the locking balls 29 are no longer urged into mating engagement with the inner surface 31 of the cylindrical portion 23 of the resetting carriage 21. Accordingly, the resetting carriage 21 is free to translate with respect to the cylindrical portion 19 of the cartridge holder 17 and, in turn, the base plate 6.

Figure 3A:
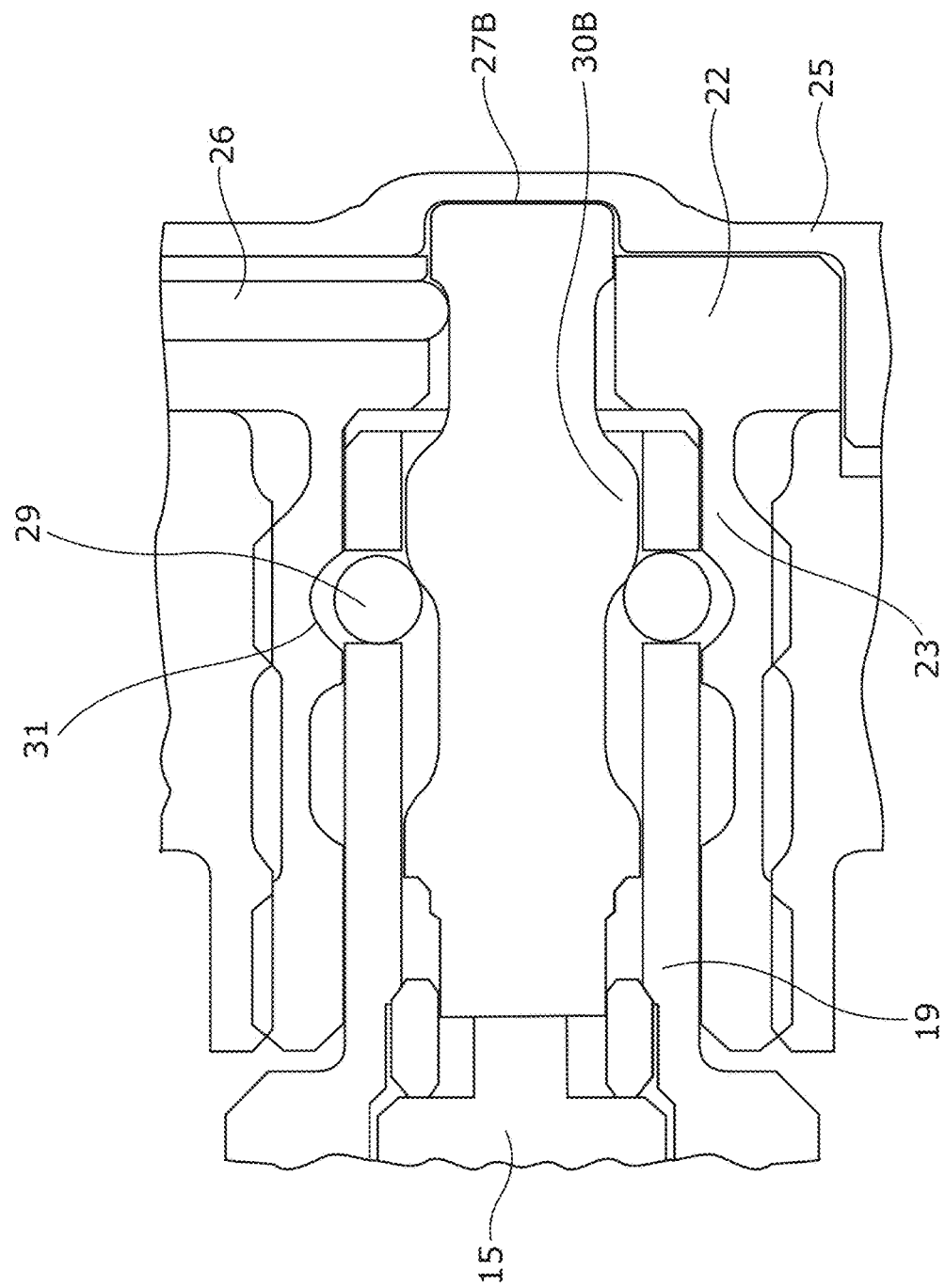
FIG. 3A shows an enlarged part of FIG. 3.
Figure 4:
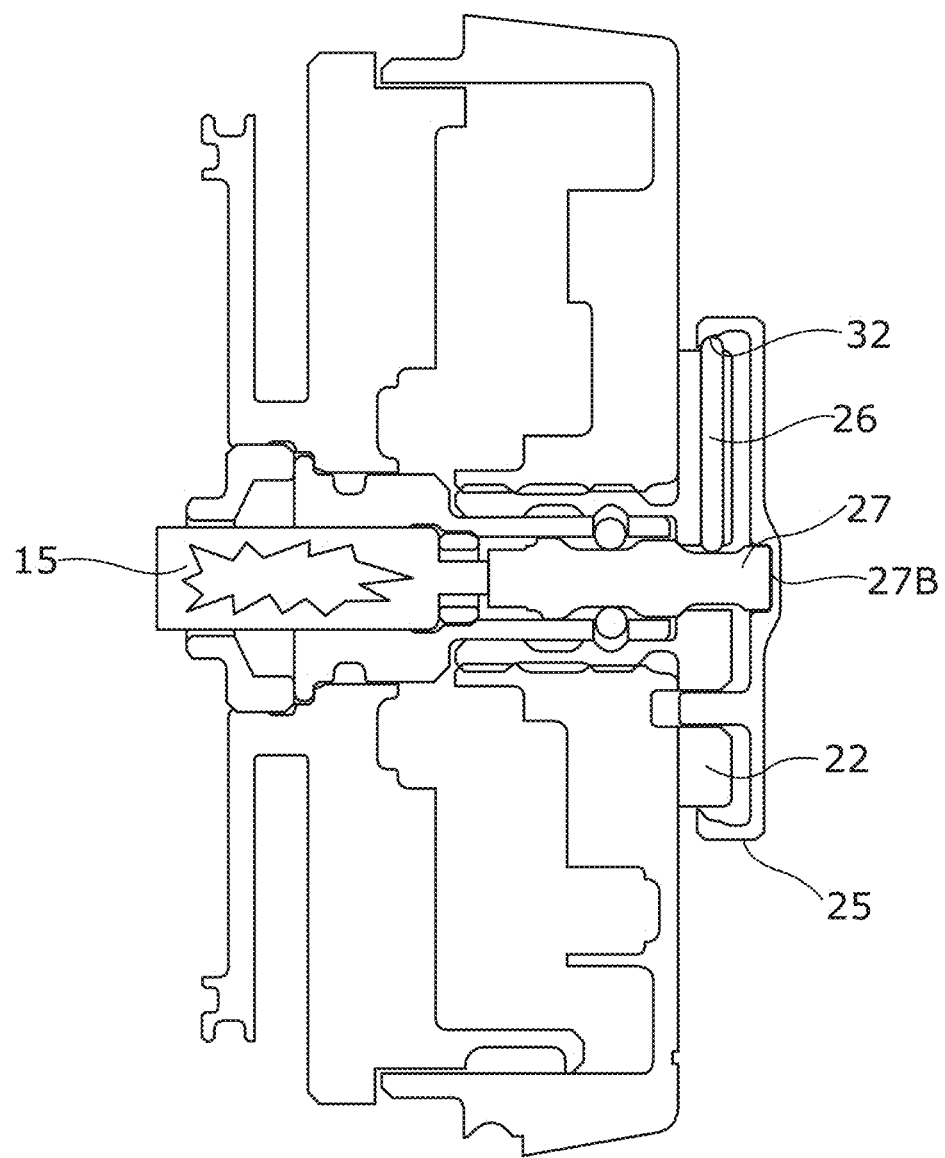
FIG. 4 shows the buckle assembly in a second phase of initiation of the emergency release arrangement.

The shuttle member 27 translates until the end 27B of the shuttle member 27, remote from the cartridge 15, abuts the inside surface of the reset plate 25 (see FIG. 3A). As a result of this movement, the locking pin 26 within the reset disc portion 22 no longer abuts against the inner ramped section 32 of the reset plate 25. Accordingly, the reset plate 25 is operable to translate with respect to the reset disc portion 22 of the resetting carriage 21. See FIG. 4.

As the reset plate 25 is caused to move away from the reset disc portion 22 of the resetting carriage 21, the second radially enlarged portion 30B of the shuttle member 27 engages against the aperture of the circular disc portion 22 (FIG. 4A).

Further translation of the shuttle member 27 (to the right) thus urges the resetting carriage 21 away from the base plate 6. By virtue of the resetting carriage 21 being retained within a threaded aperture 24 of the face plate 7, the face plate 7 is also caused to translate away from the base plate 6. See FIG. 5.

Figure 5:
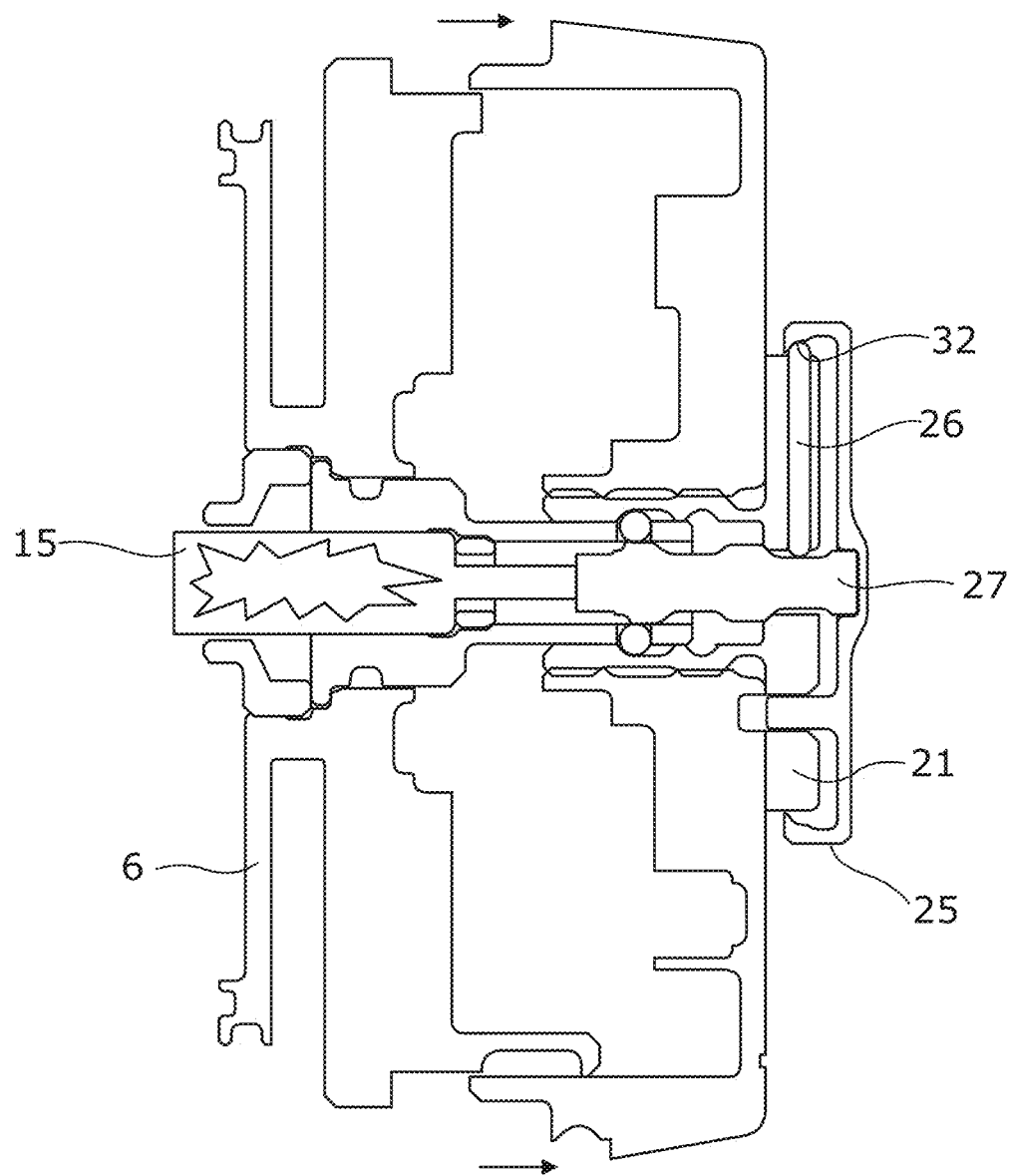
FIG. 5 shows the buckle assembly in a final phase of initiation of the emergency release arrangement, in which the lug has been released.
Figure 5A:
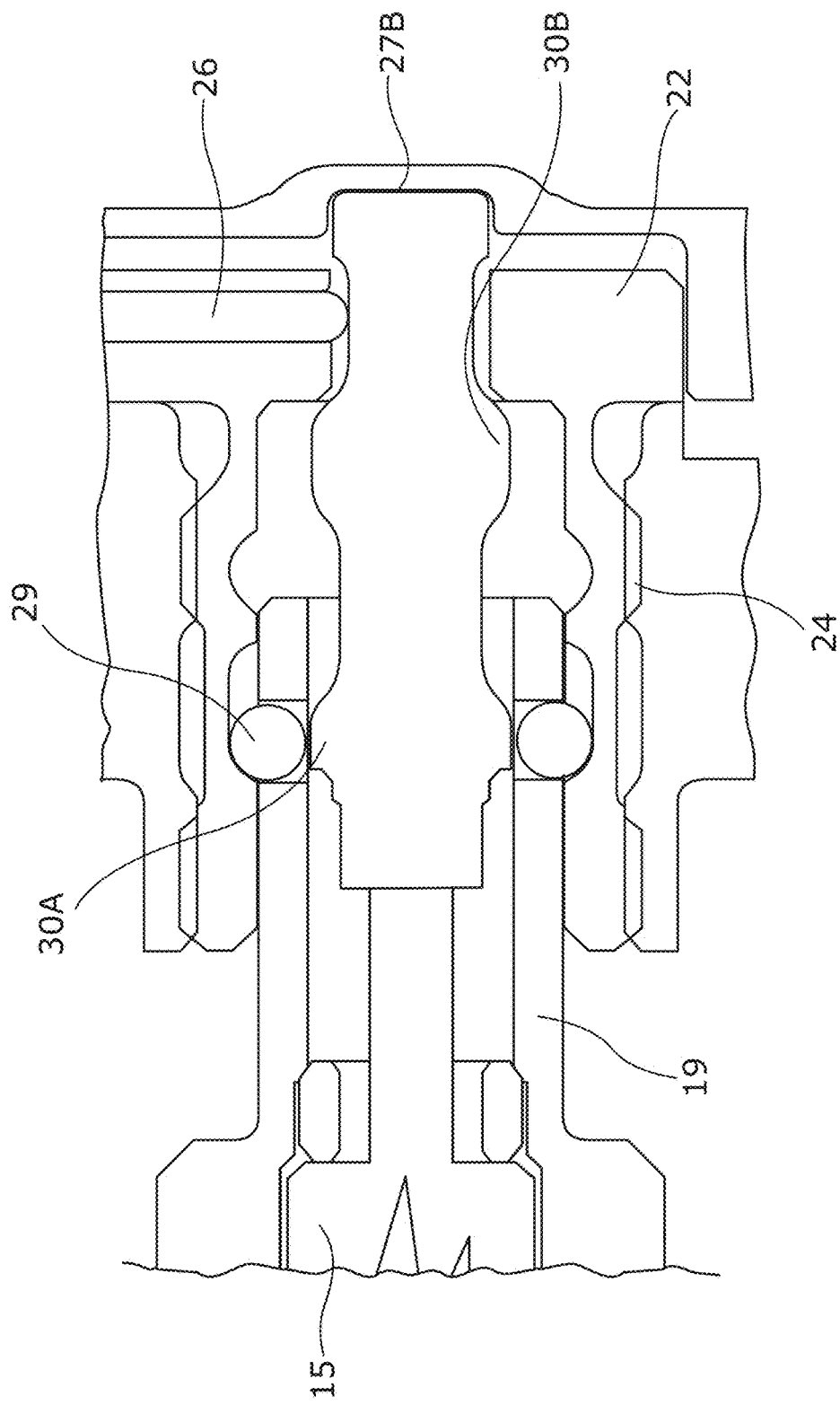
FIG. 5A shows an enlarged part of FIG. 5.

In the arrangement shown in FIG. 5, the face plate 7 is spaced away from the base plate 6 by a predetermined distance. As a result, the socket plungers 8 no longer protrude through the apertures of the lugs, which allows the lugs 3 to be released from the sockets 2.

Resetting Arrangement

Figure 6:
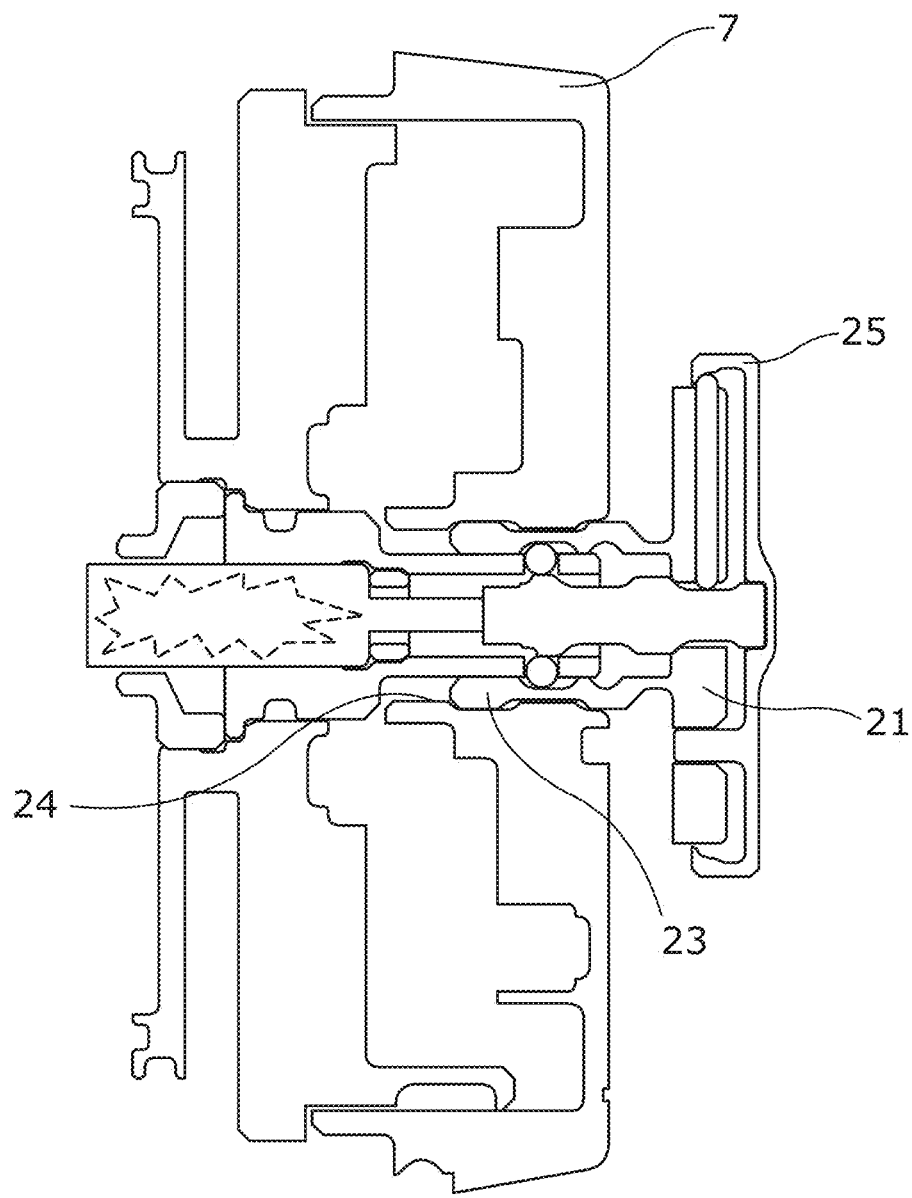
FIG. 6 shows the buckle assembly during resetting.
Figure 6A:
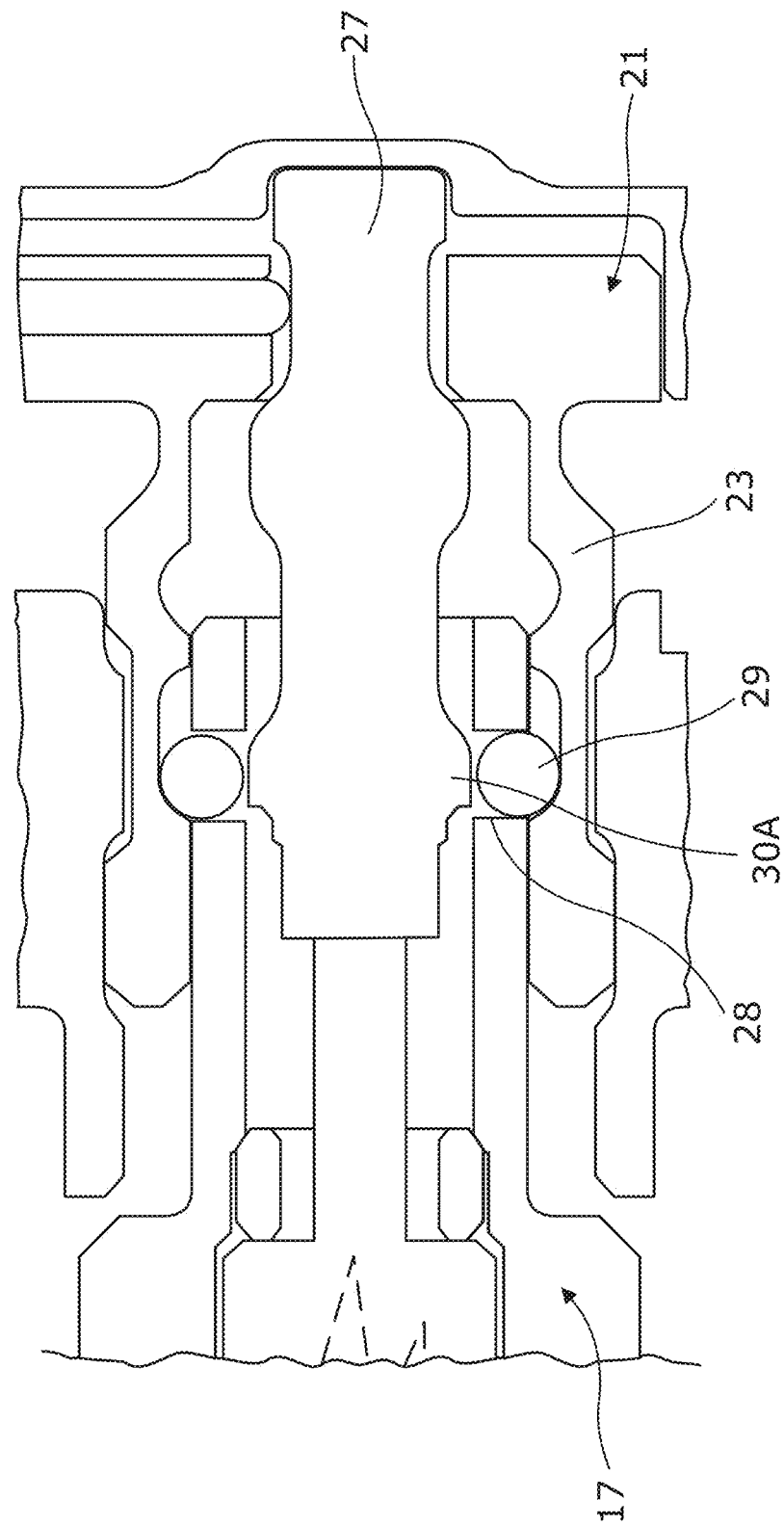
FIG. 6A shows an enlarged part of FIG. 6.

The operation of the manually operable resetting arrangement will now be described, with reference to FIG. 6.

As the reset plate 25 and resetting carriage 21 are together rotated with respect to the face plate 7, the threaded interface between the cylindrical portion 23 of the resetting carriage 21 and the aperture 24 of the face plate 7 causes the face plate 7 to translate away from the resetting carriage 21. At the same time, the resetting carriage 21 translates away from the base plate 6. The shuttle member 27 is also caused to translate along with the resetting carriage 21, since it is held in place by the locking pins 26 which are urged by the reset disc into a reduced thickness section of the shuttle member 27. As the resetting carriage 21 continues to be rotated with respect to the face plate 7, the shuttle member 27 translates with respect to the cylindrical portion 19 of the cartridge holder 17 until the first radially enlarged section 30A end of the shuttle member 27 urges the locking balls 29 through the apertures 28 in the cylindrical portion 19 of the cartridge holder 17. In turn, these locking balls 29 impart against an enlarged end section of the cylindrical portion 23 of the resetting carriage 21, preventing further translation of the resetting carriage 21 away from the base plate 6. In the arrangement shown in FIG. 6, the resetting carriage 21, reset plate 20 and shuttle member 27 are at their furthest extent from the base plate 6.

When the resetting carriage 21 has been rotated with respect to the face plate 7 to its maximum extent, the socket plungers 8 (not shown) once again extend across the socket 2 allowing the user to retain a lug within the socket.

Accordingly, a benefit of the present invention is that, if the emergency release arrangement is inadvertently activated, a user may still subsequently retain at least one lug within the socket by manually resetting the buckle assembly. After landing, the buckle assembly can be serviced and the emergency release arrangement reset.

A further benefit of the present invention is that, by virtue of the protrusion of the resetting carriage from the face plate, it is immediately visually apparent that the buckle assembly has been triggered and manually reset. This serves as a visual indicator that the buckle assembly must not be used until the emergency release arrangement has been restored.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A buckle assembly comprising:
   a base plate having at least one socket to receive and retain at least one lug therein;
   a face plate translatable with respect to the base plate;
   an emergency release arrangement configured to release the at least one lug from the socket in response to a predetermined trigger signal by translating the face plate away from the base plate to transition the buckle assembly from a pre-triggered state to a triggered state; and
   a manually operable resetting arrangement configured to retain the at least one lug re-inserted into the at least one socket when the buckle assembly is in the triggered state, the resetting arrangement having a reset plate, the reset plate configured to rotate with respect to the base plate to cause the face plate to translate toward the base plate, thereby allowing the buckle assembly to retain the at least one lug within the at least one socket when in the triggered state.

2. A buckle assembly according to claim 1, wherein the resetting arrangement is configured to retain the at least one lug in the socket by rotating the reset plate relative to the base plate.

3. A buckle assembly according to claim 1, further comprising at least one socket plunger associated with the face plate, the socket plunger biased towards the base plate, and receivable in use in an aperture of the at least one lug, to retain the lug in the socket wherein the buckle assembly is configured to release the lug from the socket when the base plate and face plate are spaced apart by at least a predetermined distance.

4. A buckle assembly according to claim 1, wherein the emergency release arrangement comprises a protractor cartridge.

5. A buckle assembly according to claim 1, further comprising a resetting carriage associated with the reset plate, an outer surface of a cylindrical portion of the resetting carriage being threaded and received within a threaded bore of the face plate.

6. A buckle assembly according to claim 5, wherein the emergency release arrangement comprises a protractor cartridge mounted in a cartridge holder, and a part of the cartridge holder is cylindrical and received within the cylindrical portion of the resetting carriage.

7. A buckle assembly according to claim 6, further comprising a shuttle member translatable within the cylindrical portion of the cartridge holder and arranged in abutment with the operational end of the protractor cartridge.

8. A buckle assembly according to claim 7, wherein upon initiation of the protractor cartridge, the shuttle member is caused to translate away from the cartridge and to engage with the resetting carriage, the force imparted by the protractor cartridge causing the resetting carriage and face plate to translate away from the base plate by at least a predetermined amount.

9. A buckle assembly according to claim 7, configured such that, before triggering of the cartridge, the shuttle member is positioned to prevent the resetting carriage from translating with respect to the cartridge holder.

10. A buckle assembly according to claim 9, wherein:
the cylindrical portion of the cartridge holder comprises at least one aperture to retain at least one locking ball; and
the shuttle member varies in profile along its length.

11. A buckle assembly according to claim 1, further comprising a water sensor configured to send a trigger signal to the emergency release arrangement upon detection of water, thereby causing the emergency release arrangement to release the at least one lug from the socket.

12. A buckle assembly comprising:
a base plate having at least one socket to receive and retain at least one lug therein;
a face plate translatable with respect to the base plate;
an emergency release arrangement configured to release the at least one lug from the socket in response to a predetermined trigger signal by translating the face plate away from the base plate to transition the buckle assembly from a pre-triggered state to a triggered state;
a water sensor having a plurality of water sensing modules, the water sensor configured to send the trigger signal to the emergency release arrangement only when at least two of the water sensor modules indicates the detection of water; and
a manually operable resetting arrangement configured to retain the at least one lug re-inserted into the at least one socket when the buckle assembly is in the triggered state, the resetting arrangement having a reset plate, the reset plate configured to rotate with respect to the base plate to cause the face plate to translate toward the base plate, thereby allowing the buckle assembly to retain the at least one lug within the at least one socket when in the triggered state.

13. A buckle assembly according to claim 12, wherein the water sensor is housed within a chamber, the chamber having a plurality of apertures for the ingress of water.

14. A buckle assembly according to claim 13, wherein each of the water sensing modules protrudes through an opening into fluid communication with the chamber, and each of the water sensing modules is surrounded by a lip.

15. A buckle assembly according to claim 1, further including the at least one lug.

16. A harness arrangement comprising at least one buckle according to claim 1.

17. A buckle assembly according to claim 1, further comprising:
a manual release arrangement configured to release the at least one lug from the at least one socket.

* * * * *